(12) United States Patent
Lee et al.

(10) Patent No.: US 9,634,794 B2
(45) Date of Patent: *Apr. 25, 2017

(54) METHOD AND APPARATUS FOR TRANSCEIVING A MIMO PACKET IN A WIRELESS LAN SYSTEM

(71) Applicant: LG Electronics Inc., Seoul (KR)

(72) Inventors: Dae Won Lee, Anyang-si (KR); Byeong Woo Kang, Anyang-si (KR); Yu Jin Noh, Anyang-si (KR); Yong Ho Seok, Anyang-si (KR); Dong Wook Roh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

This patent is subject to a terminal disclaimer.

(21) Appl. No.: 14/502,627

(22) Filed: Sep. 30, 2014

(65) Prior Publication Data

US 2015/0023291 A1    Jan. 22, 2015

Related U.S. Application Data

(63) Continuation of application No. 13/505,388, filed as application No. PCT/KR2011/004819 on Jun. 30, 2011, now Pat. No. 8,879,490.

(Continued)

(51) Int. Cl.
*H04L 1/00* (2006.01)
*H04L 1/06* (2006.01)
(Continued)

(52) U.S. Cl.
CPC .......... *H04L 1/0009* (2013.01); *H04B 7/0413* (2013.01); *H04B 7/0452* (2013.01);
(Continued)

(58) Field of Classification Search
CPC ... H04L 1/0009; H04L 1/0003; H04L 1/0031; H04L 1/06; H04L 27/2602; H04L 1/0075; H04B 7/0413; H04B 7/0452; H04W 84/12

See application file for complete search history.

(56) References Cited

U.S. PATENT DOCUMENTS 8,675,597 B2    3/2014   Lee et al.
2005/0157805 A1  7/2005  Walton et al.
(Continued)

FOREIGN PATENT DOCUMENTS

CN    101068124 A    11/2007
CN    101258730 A    9/2008
(Continued)

OTHER PUBLICATIONS

Kim et al., "GroupID Concept for Downlink MU-MIMO Transmission," IEEE 802.11-10/0073r0, Jan. 18, 2010, slides 1-8.
(Continued)

*Primary Examiner* — Christopher Grey
(74) *Attorney, Agent, or Firm* — Birch, Stewart, Kolasch & Birch, LLP (57) ABSTRACT

A method of transmitting a packet in a wireless local area network system. The method is performed by a transmitting station and includes generating a packet including at least one spatial stream and first control information including a first field and a second field, and transmitting the packet to at least one receiving station. The first field indicates a group ID of the at least one receiving station and whether the packet is generated based on a single user transmission scheme or a multi user transmission scheme. Content of the second field is determined based on whether the packet is generated based on the single user transmission scheme or the multi user transmission scheme, the second field indicates a modulation and coding scheme (MCS) index used for (Continued)

the packet if the packet is generated based on the single user transmission, and the second field indicates an encoding scheme applied to the at least one receiving station if the packet is generated based on the multi user transmission scheme.

20 Claims, 7 Drawing Sheets

Related U.S. Application Data (60) Provisional application No. 61/360,915, filed on Jul. 1, 2010, provisional application No. 61/362,673, filed on Jul. 8, 2010, provisional application No. 61/407,546, filed on Oct. 28, 2010.

(51) Int. Cl.
*H04L 27/26* (2006.01)
*H04W 84/12* (2009.01)
*H04B 7/0413* (2017.01)
*H04B 7/0452* (2017.01)

(52) U.S. Cl.
CPC .......... *H04L 1/0031* (2013.01); *H04L 1/0075* (2013.01); *H04L 1/06* (2013.01); *H04L 27/2602* (2013.01); *H04W 84/12* (2013.01); *H04L 1/0003* (2013.01)

(56) References Cited

U.S. PATENT DOCUMENTS

| | | |
|---|---|---|
| 2007/0258536 A1 | 11/2007 | Kim et al. |
| 2008/0244350 A1 | 10/2008 | de Carvalho et al. |
| 2008/0247370 A1 | 10/2008 | Gu et al. |
| 2009/0074099 A1 | 3/2009 | Zheng et al. |
| 2009/0239565 A1 | 9/2009 | Han et al. |
| 2009/0257383 A1 | 10/2009 | Lee et al. |
| 2011/0002319 A1 | 1/2011 | Husen et al. |
| 2011/0096796 A1* | 4/2011 | Zhang .................. H04B 7/0669 370/474 |
| 2011/0096797 A1 | 4/2011 | Zhang et al. |
| 2012/0087435 A1 | 4/2012 | Gomadam et al. |
| 2013/0235836 A1 | 9/2013 | Roh et al. |
| 2014/0064223 A1* | 3/2014 | Stephens .................. H04L 27/20 370/329 |
| 2015/0341102 A1* | 11/2015 | Erceg .................. H04B 7/0684 370/338 |

FOREIGN PATENT DOCUMENTS

| | | | |
|---|---|---|---|
| JP | 2007-251924 | A | 9/2007 |
| JP | 2011-142454 | A | 7/2011 |
| KR | 10-2006-0111702 | A | 10/2006 |
| KR | 10-2008-0086033 | A | 9/2008 |
| WO | WO 2008/083804 | A2 | 7/2008 |
| WO | WO 2009/109894 | A1 | 9/2009 |
| WO | WO 2009/114379 | A1 | 9/2009 |
| WO | WO 2009/121045 | A2 | 10/2009 |
| WO | WO 2010/024582 | A2 | 3/2010 |
| WO | WO 2011/050320 | A1 | 4/2011 |

OTHER PUBLICATIONS

Noh et al., "Preamble Design aspects for 11ac," IEEE 802.11-10/0363r0, Mar. 17, 2010, slides 1-16.

Stacey et al., "IEEE P802.11 Wireless LANs; Proposed Specification Framework edits for preamble structure and A-MPDU," IEEE 802.11-09/0992r3, Jan. 21, 2010, pp. 1-8.

\* cited by examiner

METHOD AND APPARATUS FOR
TRANSCEIVING A MIMO PACKET IN A
WIRELESS LAN SYSTEM

CROSS-REFERENCE TO RELATED APPLICATIONS

This application is a Continuation of co-pending U.S. patent application Ser. No. 13/505,388 filed on May 1, 2012, which is the National Phase of PCT/KR2011/004819 filed on Jun. 30, 2011, which claims priority under 35 U.S.C. 119(e) to U.S. Provisional Application Nos. 61/360,915 filed on Jul. 1, 2010, 61/362,673 filed on Jul. 8, 2010, and 61/407,546 filed on Oct. 28, 2010. The contents of all of these applications are hereby incorporated by reference as fully set forth herein in their entirety.

BACKGROUND OF THE INVENTION

Field of the Invention

The present invention relates to a wireless local area network (WLAN) system, and more particularly, to a method of transmitting and receiving a packet on the basis of a multiple input multiple output (MIMO) transmission scheme by an access point (AP) and a station (STA).

Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

To effectively utilize a radio channel, the next-generation WLAN system supports multi user-multiple input multiple output (MU-MIMO) transmission in which a plurality of non-access point (AP) stations (STAs) concurrently access to a channel. According to the MU-MIMO transmission, an AP can transmit a frame concurrently to one or more MIMO-paired STAs.

As an encoding scheme, binary convolutional coding (BCC) and low density parity check (LDPC) encoding are provided in a WLAN system. Since data transmission and reception between an AP and an STA have a one-to-one relation in a legacy WLAN system and a WLAN system supporting a high throughput, it has been enough to attach information related to an encoding scheme of encoded data to a packet to be transmitted. However, a next generation WLAN system may have a different encoding scheme of a data sequence to be transmitted to each STA since the AP can transmit packets simultaneously to a plurality of STAs by using a MU-MIMO transmission scheme.

The AP may have a different a modulation and coding scheme (MCS) to be signaled according to a situation where SU-MIMO transmission is achieved to a specific STA or a situation where MU-MIMO transmission is achieved to a plurality of STAs. In case of the SU-MIMO transmission, an MCS index is signaled to a specific STA. However, in case of the MU-MIMO transmission, respective MCS indices need to be signaled to a plurality of MU-MIMO paired STAs. Therefore, there is a need for a method of transmitting and receiving a packet by considering a MIMO transmission scheme of an AP and a capability of a transmission target STA in a next generation WLAN system.

SUMMARY OF THE INVENTION

The present invention provides a method of transmitting and receiving a multiple input multiple output (MIMO) packet in a wireless local area network (WLAN) system supporting a multi user (MU)-MIMO transmission scheme.

In an aspect, a method of transmitting a multiple input multiple output (MIMO) packet by a transmitter in a wireless local area network (WLAN) system is provided. The method includes: generating a MIMO packet including at least one spatial stream set transmitted respectively to at least one receiver, wherein each spatial stream set is encoded on the basis of one of two encoding schemes; transmitting first control information including a MIMO indicator and a first modulation and coding scheme (MCS) field, wherein the MIMO indicator indicates whether the MIMO packet is for single user (SU)-MIMO or multi user (MU)-MIMO, and the first MCS field indicates an MCS used for the MIMO packet if the MIMO packet is for SU-MIMO transmission, and indicates an encoding scheme applied for each of the spatial stream sets if the MIMO packet is for MU-MIMO transmission; and transmitting the MIMO packet to at least one receiver. The two encoding schemes are low-density parity check (LDPC) encoding scheme and binary convolution coding (BCC) encoding.

If the MIMO packet is for MU-MIMO transmission, the MIMO indicator may indicate MU-MIMO transmission by indicating a receiver group including the at least one receiver.

The method may further include transmitting second control information including a second MCS field, wherein the second MCS field indicates an MCS used for each of the at least one spatial stream set if the MIMO packet is for MU-MIMO transmission.

The method may further include, after transmitting the first control information, transmitting a training sequence used to estimate a MIMO channel between the transmitter and the at least one receiver before transmitting the second control information.

The first control information may further include 'the number of spatial stream' sub-field indicating the number of spatial streams included in each of the at least one spatial stream.

In another aspect a wireless apparatus is provided. The apparatus includes: a transceiver for receiving or transmitting a MIMO packet; and a processor operationally coupled to the transceiver. The processor is configured for: generating a MIMO packet including at least one spatial stream set transmitted respectively to at least one receiver, wherein each spatial stream set is encoded on the basis of one of two encoding schemes; transmitting first control information including a MIMO indicator and a first MCS field, wherein the MIMO indicator indicates whether the MIMO packet is for SU-MIMO or MU-MIMO, and the first MCS field indicates an MCS used for the MIMO packet if the MIMO packet is for SU-MIMO transmission, and indicates an encoding scheme applied for each of the spatial stream sets if the MIMO packet is for MU-MIMO transmission; and transmitting the MIMO packet to at least one receiver. The two encoding schemes are LDPC encoding scheme and BCC encoding.

In still another aspect, a method of decoding a MIMO packet by a receiver in a WLAN system is provided. The method includes: receiving a MIMO indicator indicating whether a MIMO packet including at least one spatial stream set transmitted to at least one receiver is for MU-MIMO transmission or for SU-MIMO transmission, wherein if the MIMO packet is for MU-MIMO transmission, the MIMO indicator indicates MU-MIMO transmission by indicating a receiver group of the MIMO packet; receiving a coding field, wherein the coding field indicates an encoding scheme applied to a first spatial stream set among the at least one spatial set; receiving a first MCS field, wherein the first MCS field indicates an MCS used for the MIMO packet if the MIMO packet is for SU-MIMO transmission, and indicates an encoding scheme applied to each of the remaining sets other than the first spatial stream set among the at least one spatial stream set if the MIMO packet is for MU-MIMO transmission; and receiving the MIMO packet. If the MIMO packet is for MU-MIMO, the method further include: confirming whether the receiver is a member of the receiver group; and if the receiver is the member of the receiver group, decoding the MIMO packet according to an encoding scheme applied to a spatial stream set of the receiver among encoding schemes indicated by the coding field and the first MCS field.

If the MIMO packet is for SU-MIMO, the method may include decoding the MIMO packet according to the encoding scheme indicated by the coding field.

In case of transmitting and receiving a physical layer convergence procedure (PLCP) protocol data unit (PPDU), a transmission scheme can be confirmed by interpreting control information included in the PPDU. A reception station (STA) can differently interpret control information additionally provided according to the transmission scheme, and can obtain data by performing decoding and demodulation according to a supported encoding scheme and modulation and coding scheme (MCS).

When a plurality of multi user-multiple input multiple output (MU-MIMO) paired STAs have different supported capabilities such as a supported encoding scheme or the like, an access point (AP) that transmits a PPDU can provide a service to a various types of STAs by providing the STAs with control information that can be interpreted differently according to a PPDU transmission scheme. This can improve compatibility with a wireless local area network (WLAN) system.

DETAILED DESCRIPTION OF THE INVENTION

Figure 1:
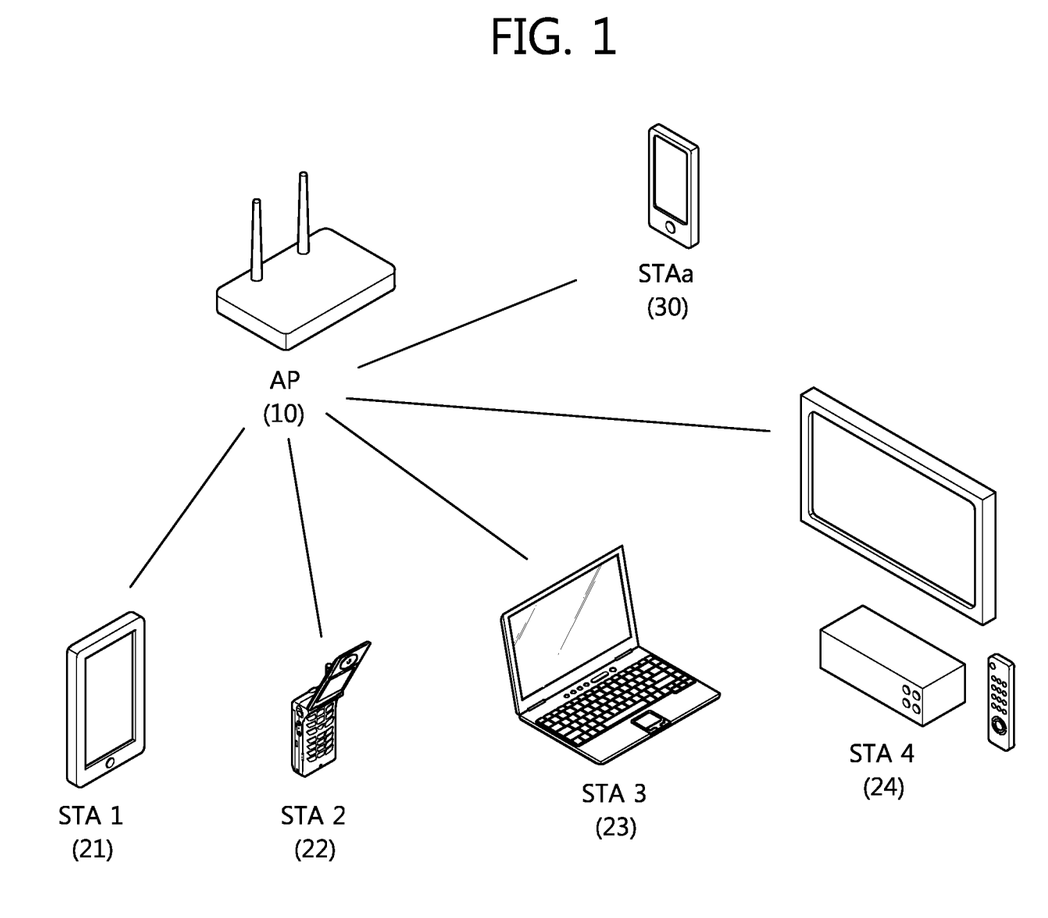
FIG. 1 shows a structure of a wireless local area network (WLAN) system to which an embodiment of the present invention is applicable.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Figure 2:
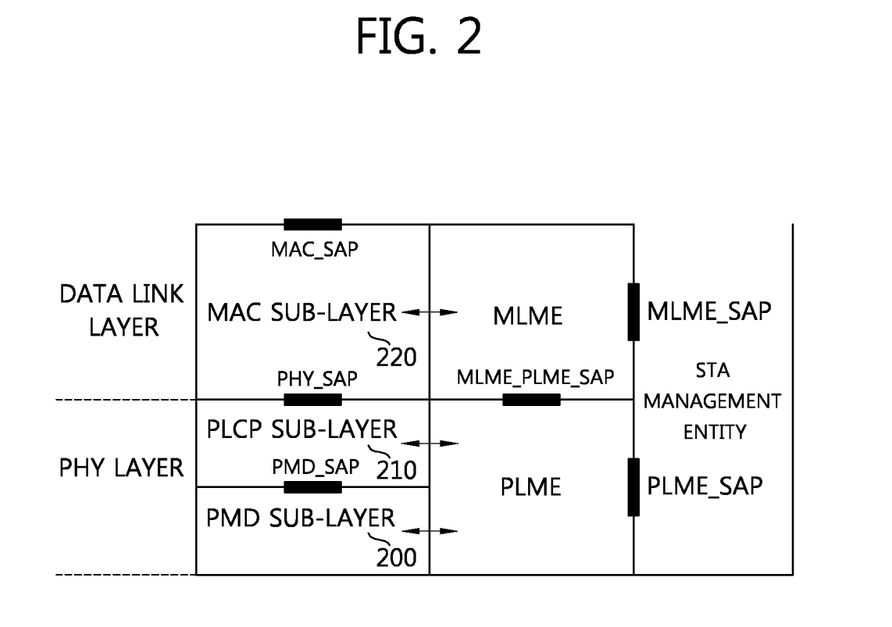
FIG. 2 shows a physical layer architecture of a WLAN system supported by institute of electrical and electronics engineers (IEEE 802.11).

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver in a process of receiving the PSDU from the MAC sub-layer 220 and delivering the PSDU to the PMD sub-layer 200. The additional field attached to the PSDU in this case may be a PLCP preamble, a PLCP header, tail bits required to reset an convolution encoder to a zero state, etc. The PLCP preamble serves to allow a receiver to prepare a synchronization function and antenna diversity before the PSDU is transmitted. In the PSDU, the data field may include padding bits, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives a PLCP protocol data unit (PPDU). The PLCP header includes a field that contains information on a PPDU to be transmitted, which will be described below in greater detail with reference to FIG. 3.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data.

Unlike the conventional WLAN system, the next generation WLAN system requires a higher throughput. This is called a very high throughput (VHT). For this, the next generation WLAN system intends to support 80 MHz, contiguous 160 MHz, non-contiguous 160 MHz bandwidth transmission and/or higher bandwidth transmission. In addition, a multi user-multiple input multiple output (MU-MIMO) transmission scheme is provided for the higher throughput. In the next generation WLAN system, an AP can transmit a data frame simultaneously to at least one or more MU-MIMO paired STAs.

Referring back to FIG. 1, in the WLAN system shown in the drawing, the AP 10 can simultaneously transmit data to an STA group including at least one STA among a plurality of STAs 21, 22, 23, 24, and 30 associated with the AP 10. Data to be transmitted to each STA can be transmitted through a different spatial stream. A data packet to be transmitted by the AP 10 is a PPDU generated and transmitted in a physical layer of the WLAN system or a data field included in a PPDU, and can be referred to as a frame. That is, the data field included in the PPDU for SU-MIMO and/or MU-MIMO can be called a MIMO packet. It is assumed in the embodiment of the present invention that the STA1 21, the STA2 22, the STA3 23, and the STA4 24 belong to a transmission target STA group which is MU-MIMO paired with the AP 10. In this case, data may not be transmitted to a specific STA of the transmission target STA group since a spatial stream is not allocated to the specific STA. Meanwhile, although the STAa 30 is associated with the AP, it is assumed that the STAa 30 is an STA not included in the transmission target STA group.

An identifier can be allocated to a transmission target STA group in order to support MU-MIMO transmission in the WLAN system, and such an identifier is called a group identifier (ID). The AP transmits a group ID management frame including group definition information for group ID allocation to STAs supporting MU-MIMO transmission.

Accordingly, the group ID is allocated to STAs before PPDU transmission. A plurality of group IDs may be allocated to one STA.

Table 1 below shows an information element included in the group ID management frame.

TABLE 1

| order | information |
|---|---|
| 1 | category |
| 2 | VHT action |
| 3 | membership status |
| 4 | spatial stream position |

In the category field and the VHT action field, a frame corresponds to a management frame, and is configured to be able to identify a group ID management frame used in a next generation WLAN system supporting MU-MIMO.

As shown in Table 1, the group definition information includes membership status information indicating whether it belongs to a specific group ID, and if it belongs to the specific group ID, includes spatial stream location information indicating at which position a spatial stream set of a corresponding STA is located among all spatial streams based on MU-MIMO transmission.

Since one AP manages a plurality of group IDs, the membership status information provided to one STA needs to indicate whether an STA belongs to each group ID managed by the AP. Therefore, the membership status information can exist in an array format of sub-fields indicating whether it belongs to each group ID. Since the spatial stream location information indicates a location for each group ID, it can exist in an array format of sub-fields indicating a location of a spatial stream set occupied by an STA for each group ID.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field and thus confirms whether the STA is a member STA of a transmission target STA group. If it is confirmed that the STA is the member of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

In a WLAN system, STAs may support different capabilities. The STAs may have different channel bandwidth capabilities. The STA may be an STA not supporting a MIMO transmission scheme, an STA supporting a single user (SU)-MIMO transmission scheme, and an STA supporting an SU/MU-MIMO transmission scheme. In addition, a supported encoding/decoding scheme may differ depending on a type of the STA. In the WLAN system, a binary convolution coding (BCC) scheme is an encoding scheme that must be supported, whereas a low density parity check (LDPC) scheme is a scheme that is selectively supported. Therefore, the STA may support only the BCC encoding, or may support both the BCC encoding and the LDPC encoding.

When the AP transmits a PPDU to the STA, the AP transmits the PPDU by including signal information for interpreting the PPDU. Examples of the control information for interpreting the PPDU may include a channel bandwidth used to transmit the PPDU, information indicating a transmission target STA or STA group of the PPDU, information regarding a transmission scheme, and MCS information. When transmitting the PPDU, the AP may perform SU-MIMO transmission to one STA or may perform MU-MIMO transmission to at least one STA. In case of SU-MIMO transmission, when one encoding scheme is included as signal information of a PPDU, the STA can decode the PPDU. On the other hand, since each STA may support a different encoding scheme in case of the MU-MIMO transmission, there is a need to report an encoding scheme individually for each STA. Therefore, there is a need for a MIMO packet transmission/reception method in which the AP can transmit a PPDU by including information regarding an encoding scheme for each STA according to a transmission method, and upon reception of the PPDU, the STA can interpret the PPDU and perform decoding in accordance with a well-known encoding scheme.

Figure 3:
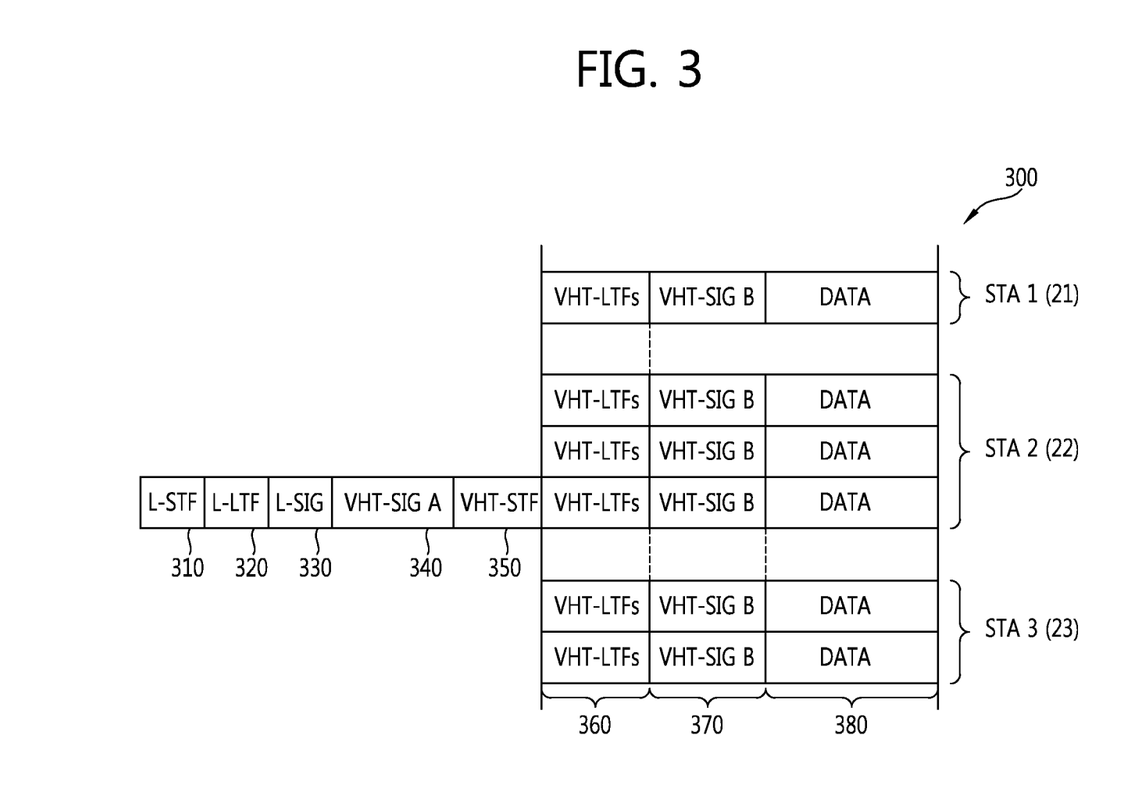
FIG. 3 shows an example of a physical layer convergence procedure (PLCP) protocol data unit (PPDU) format applicable to an embodiment of the present invention.

FIG. 3 shows an example of a PPDU format applicable to an embodiment of the present invention.

Referring to FIG. 3, a PPDU 300 includes an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sub-layer constituting a PHY converts a PSDU delivered from a MAC layer into the data field 380 by appending necessary information to the PSDU, generates the PPDU 300 by appending several fields such as the L-STF field 310, the L-LTF field 320, the L-SIG field 330, the VHT-SIGA field 340, the VHT-STF field 350, the VHT-LTF field 360, the VHT-SIGB field 370, or the like, and delivers the PPDU 300 to one or more STAs through a physical medium dependent (PMD) sub-layer constituting the PHY.

The L-STF 310 is used for frame timing acquisition, automatic gain control (AGC) convergence, coarse frequency acquisition, etc.

The L-LTF field 320 is used for channel estimation for demodulation of the L-SIG field 330 and the VHT-SIGA field 340.

The L-SIG field 330 is used when the L-STA receives the PPDU 300 and interprets it to acquire data.

The VHT-SIGA field 340 is a field related to common control information required by STAs for receiving the PPDU, and includes control information (or signal information) for interpreting the received PPDU 300. The VHT-SIGA field 340 includes channel bandwidth information used for PPDU transmission, information indicating either SU or MU-MIMO as a PPDU transmission scheme, if the transmission scheme is MU-MIMO, information indicating a transmission target STA group of a plurality of STAs which are MU-MIMO paired with the AP, information regarding a spatial stream allocated to each STA included in the transmission target STA group, identifier information related to whether space time block coding (STBC) is used, information related to a short guard interval (GI) of a transmission target STA, and modulation and coding scheme (MCS) information on a channel between a transmitter and a receiver.

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 300.

The VHT-STF 350 is used to improve performance of AGC estimation in MIMO transmission.

The VHT-LTF 360 is used when the STA estimates a MIMO channel. Since the next generation WLAN system supports MU-MIMO, the VHT-LTF field 360 can be configured by the number of spatial streams in which the PPDU 300 is transmitted. In addition, when full channel sounding is supported and is performed, the number of VHT-LTFs may increase.

The VHT-SIGB field 370 includes dedicated control information required when the plurality of MIMO-paired STAs receive the PPDU 300 to acquire data. Therefore, the STA may be designed such that the VHT-SIGB field 370 is decoded only when the common control information included in the VHT-SIGB field 370 indicates that the currently received PPDU 300 is transmitted using MU-MIMO transmission. On the contrary, the STA may be designed such that the VHT-SIGB field 370 is not decoded when the common control information indicates that the currently received PPDU 300 is for a single STA (including SU-MIMO).

The VHT-SIGB field 370 includes information on modulation, encoding, and rate-matching of each STA. A size of the VHT-SIGB field 370 may differ according to the MIMO transmission method (MU-MIMO or SU-MIMO) and a channel bandwidth used for PPDU transmission.

The data field 380 includes data intended to be transmitted to the STA. The data field 380 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field.

In a WLAN system including STAs which have different capabilities related to supportable encoding schemes, an AP needs to perform signaling with respect to an encoding scheme applied to a PPDU so that a transmission target STA can normally obtain data through PPDU reception. When transmitting the PPDU by using the SU-MIMO transmission scheme, the applied encoding scheme can be included in either a VHT-SIGA field or a VHT-SIGB field including control information. However, in a MU-MIMO transmission scheme for transmitting a PPDU to a plurality of STAs, the AP needs to provide each STA with information regarding an encoding scheme. Such a PPDU transmission and reception method can be implemented as illustrated in FIG. 4.

Figure 4:
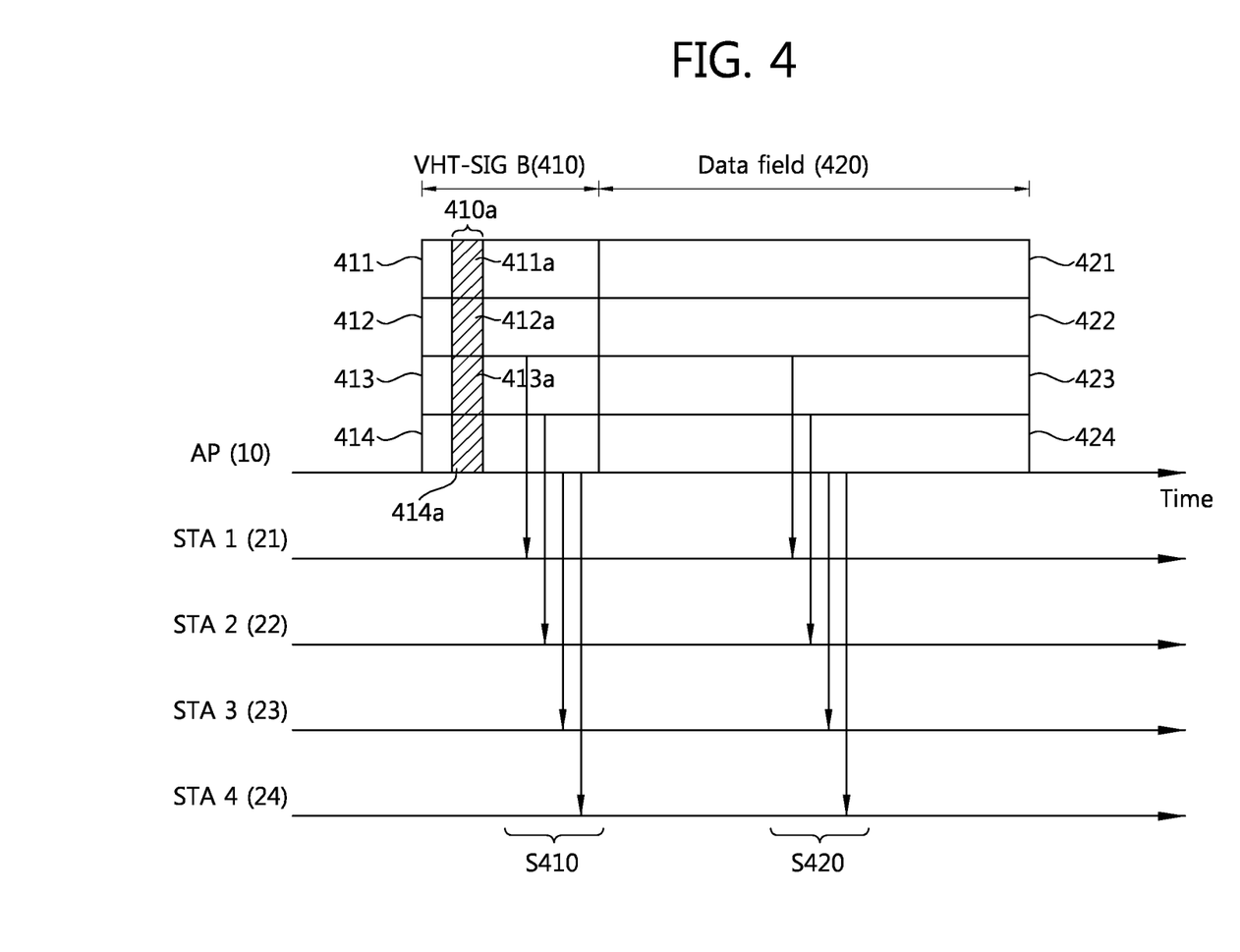
FIG. 4 is a flow diagram showing an example of a PPDU transmission and reception method according to an embodiment of the present invention.

FIG. 4 is a flow diagram showing an example of a PPDU transmission and reception method according to an embodiment of the present invention. It is assumed herein that, in a WLAN system having the structure of FIG. 1, an STA1 21, an STA2 22, an STA3 23, and an STA4 24 are included in a MU-MIMO transmission target STA group, the STA1 21 and the STA2 22 support both BCC/LDPC encoding schemes, and the STA3 23 and the STA4 24 support only the BCC encoding scheme.

Referring to FIG. 4, although not shown, an AP 10 transmits a preamble and a VHT-SIGA field to the MU-MIMO paired STAs 21, 22, 23, and 24 according to the PPDU format of FIG. 3. Subsequently, the AP 10 transmits a VHT-SIGB field 410 to each of the STAs 21, 22, 23, and 24 (step S410). Since the VHT-SIGB field 410 is transmitted through beamforming, VHT-SIGB fields 411, 412, 413, and 414 are respectively transmitted to the STAs 21, 22, 23, and 24. Subsequently, the AP 10 transmits a data field 420 to each of the STAs 21, 22, 23, and 24 (step S420).

When the AP 10 transmits the PPDU by using the MU-MIMO transmission scheme, the AP 10 can transmit the PPDU by including a coding sub-field 410a including encoding indication information. In this case, the coding sub-field 410a is a bit field, and can be set to '0' when using BCC encoding and can be set to '1' when using LDPC encoding. When the coding sub-field 410a is included in the VHT-SIGB field 410 including dedicated control information for each STA, the AP 10 can signal encoding information for each of a plurality of MU-MIMO paired STAs. However, as a method of indicating an encoding scheme, a bit value can be used in an opposite way.

If coding sub-fields 411a and 412a included in the VHT-SIGB fields 411 and 412 transmitted to the STA1 21 and the STA2 22 are set to '0', the STA1 21 and the STA2 22 obtain data by performing BCC decoding on data fields 421 and 422 transmitted to the STA1 21 and the STA2 22 in accordance with BCC encoding, and if the coding sub-fields 411a and 412a are set to '1', the STA1 21 and the STA2 22 can obtain data by performing LDPC decoding on the data fields 421 and 422 in accordance with LDPC encoding. If coding sub-fields 413a and 414a included in the VHT-SIGB fields 413 and 414 transmitted to the STA3 23 and the STA4 24 are set to '0', the STA3 23 and the STA4 24 obtain data by performing BCC decoding on data fields 423 and 424 transmitted to the STA3 23 and the STA4 24 in accordance with BCC encoding. If the coding sub-fields 413a and 414a are set to '1', this can be ignored and BCC decoding can be performed. However, since the AP 10 can obtain information regarding a capability of an STA associated through a process of associating with the STA, a coding sub-field value can be set such that BCC encoding is indicated for the STAs 23 and 24 supporting BCC encoding, and LDPC encoding is indicated for the STAs 21 and 22 supporting LDPC encoding.

According to the embodiment of FIG. 4, the AP 10 can indicate an encoding scheme to each STA. However, a latency problem may occur since a data field can be decoded only after a value of the coding sub-field 410a is confirmed by interpreting the VHT-SIGB field 410. In order to solve the latency problem, a PPDU transmission method can be proposed in which a coding sub-field indicating an encoding scheme in use is included in the VHT-SIGA field.

Figure 5:
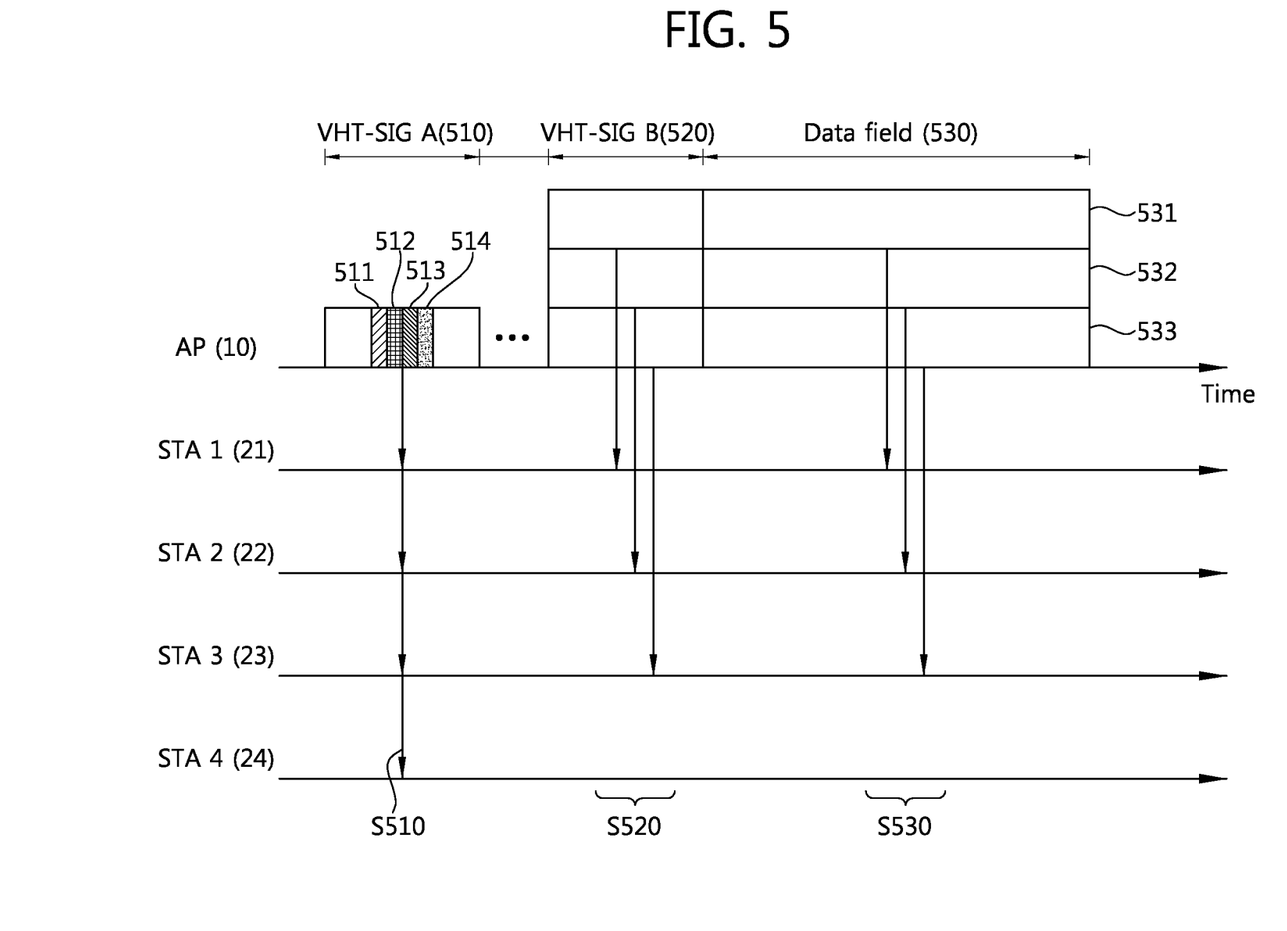
FIG. 5 is a flow diagram showing a PPDU transmission method on the basis of a multi user-multiple input multiple output (MU-MIMO) transmission scheme according to an embodiment of the present invention.

FIG. 5 is a flow diagram showing a PPDU transmission method on the basis of a MU-MIMO transmission scheme according to an embodiment of the present invention. An AP transmits a PPDU to a plurality of MU-MIMO paired STAs.

Referring to FIG. 5, an AP 10 transmits a VHT-SIGA field 510 to an STA1 21, an STA2 22, an STA3 23, and an STA4. The VHT-SIGA field 510 includes a group ID sub-field 511 including a group ID as a MIMO indicator, a spatial stream sub-field 512 including information that indicates the number of spatial streams transmitted to an STA included in an STA group indicated by the group ID, a coding sub-field 513 indicating an encoding scheme of an encoded PSDU included in a data field 530, and an MCS sub-field 514 indicating an MCS index of a channel between the AP 10 and the STA or indicating an encoding scheme of a PSDU.

The group ID sub-field 511 can be set to a value indicating an STA group including the STA1 21, the STA2 22, the STA3 23, and the STA4 24. In this case, the group ID implies that a PPDU transmitted by the AP 10 corresponds to an MU-MIMO PPDU transmitted by using an MU-MIMO transmission scheme. More specifically, the group ID can be set to a value in the range of 0 to 63. In this case, the values 0 and 63 are used to indicate that the PPDU is transmitted by using SU-MIMO. Since values 1 to 62 indicate specific STA groups, these values imply that the PPDU is transmitted by using MU-MIMO.

The spatial stream sub-field 512 indicates the number of spatial streams allocated to the respective STAs of the STA group indicated by the group ID in the group ID sub-field 511. The spatial stream sub-field 512 can be set such that the number of spatial streams is indicated from 0 to 4 by assigning 3 bits per one STA. When the number of spatial streams is 0, it implies that there is no data to be transmitted to a corresponding STA.

When the group ID sub-field 511 is set to a value indicating that transmission is performed using MU-MIMO, the coding sub-field 513 and the MCS sub-field 514 are set to a value indicating an encoding scheme of a PSDU. A PPDU transmitted using MU-MIMO includes data fields 531, 532, and 533 which are intended to be transmitted respectively to the plurality of STAs. Coded data sequences respectively included in the data fields 531, 532, and 533 may use different encoding schemes. That is, a data sequence transmitted to an STA supporting only BCC encoding is coded by using a BCC encoding scheme, whereas a data sequence transmitted to an STA supporting both BCC/LDPC encoding schemes can be coded by using an LDPC encoding scheme. Therefore, information regarding an encoding scheme of a coded data sequence included in a data field which is intended to be transmitted to each STA needs to be transmitted to each transmission target STA. For this, the coding sub-field 513 can be configured to indicate an encoding scheme applied to the data field 531 to be transmitted to the STA1 21, and the MCS sub-field 514 can be configured to indicate an encoding scheme applied to the respective data fields 532 and 533 to be transmitted to the STA2 22, the STA3 23, and the STA4 24. The STA4 24 to which no spatial stream is allocated can be configured to indicate any one of encoding schemes supported by the STA4 24, or can be configured to indicate LDPC encoding when the LDPC encoding is supported. That is, BCC encoding can be indicated when a value included in the coding sub-field 513 and the MCS sub-field 514 is '0', and LDPC encoding can be indicated when the value is '1', which implies that an encoding scheme for each STA can be indicated in a bitmap format.

The AP 10 transmits a VHT-SIGB field 520 by using a spatial stream allocated to each of STAs 21, 22, and 23 (step S520). The VHT-SIGB field 520 may include information indicating a length of a PSDU to be transmitted to a transmission target STA and an MCS index information for a channel between the AP 10 and each of the STAs 21, 22, and 23. Subsequently, the AP 10 transmits the data fields 531, 532, and 533 respectively to the STAs 21, 22, and 23 (step S530). The VHT-SIGB field 520 and the data field 530 are transmitted through beamforming according to a MU-MIMO transmission scheme.

By using the group ID of the group ID sub-field 511 of the VHT-SIGA field 510 transmitted from the AP 10, the STAs 21, 22, 23, and 24 can know whether they are transmission target STAs and whether a PPDU is transmitted by using MU-MIMO. The STA1 21, the STA2 22, and the STA3 23 can use the spatial stream sub-field 512 to confirm the number of spatial streams allocated to them. When the number of spatial streams is 0, the STA4 24 can know that there is no data to be transmitted to the STA4 24. In addition, by receiving a group ID management frame before PPDU transmission, the STAs 21, 22, 23, and 24 can know whether they belong to a specific group ID and can know their spatial stream set location information regarding a specific group ID. Therefore, the STAs 21, 22, 23, and 24 can receive the PPDU and can know which spatial streams are allocated to them.

Since a PPDU is transmitted using MU-MIMO, the STA1 21, the STA2 22, and the STA3 23 interpret the coding sub-field 513 and the MCS sub-field 514 as information indicating an encoding scheme of a data field. Therefore, in accordance with an encoding scheme indicated by the coding sub-field 513, the STA1 21 can obtain data by decoding the data field 531 transmitted by the use of a decoding scheme corresponding to the encoding scheme and MCS index information included in the VHT-SIGB field 520. The STA2 22 and the STA3 23 can obtain data by decoding the transmitted data fields 532 and 533 in accordance with an encoding scheme indicated by the MCS sub-field 514.

In the PPDU transmission and reception method of FIG. 5, the VHT-SIGB field 520 and the data field 530 are beam-formed and then are transmitted to each STA through a spatial stream. Therefore, between VHT-SIGA field transmission (step S510) and VHT-SIGB field transmission (step S520), the AP 10 can transmit a long training field (LTF) including a training sequence for channel estimation between the AP 10 and the plurality of MU-MIMO paired STAs 21, 22, 23, and 24.

Meanwhile, when the PPDU is transmitted using SU-MIMO, it is enough for the AP to report one encoding scheme to one reception STA. This will be described hereinafter in detail with reference to FIG. 6.

Figure 6:
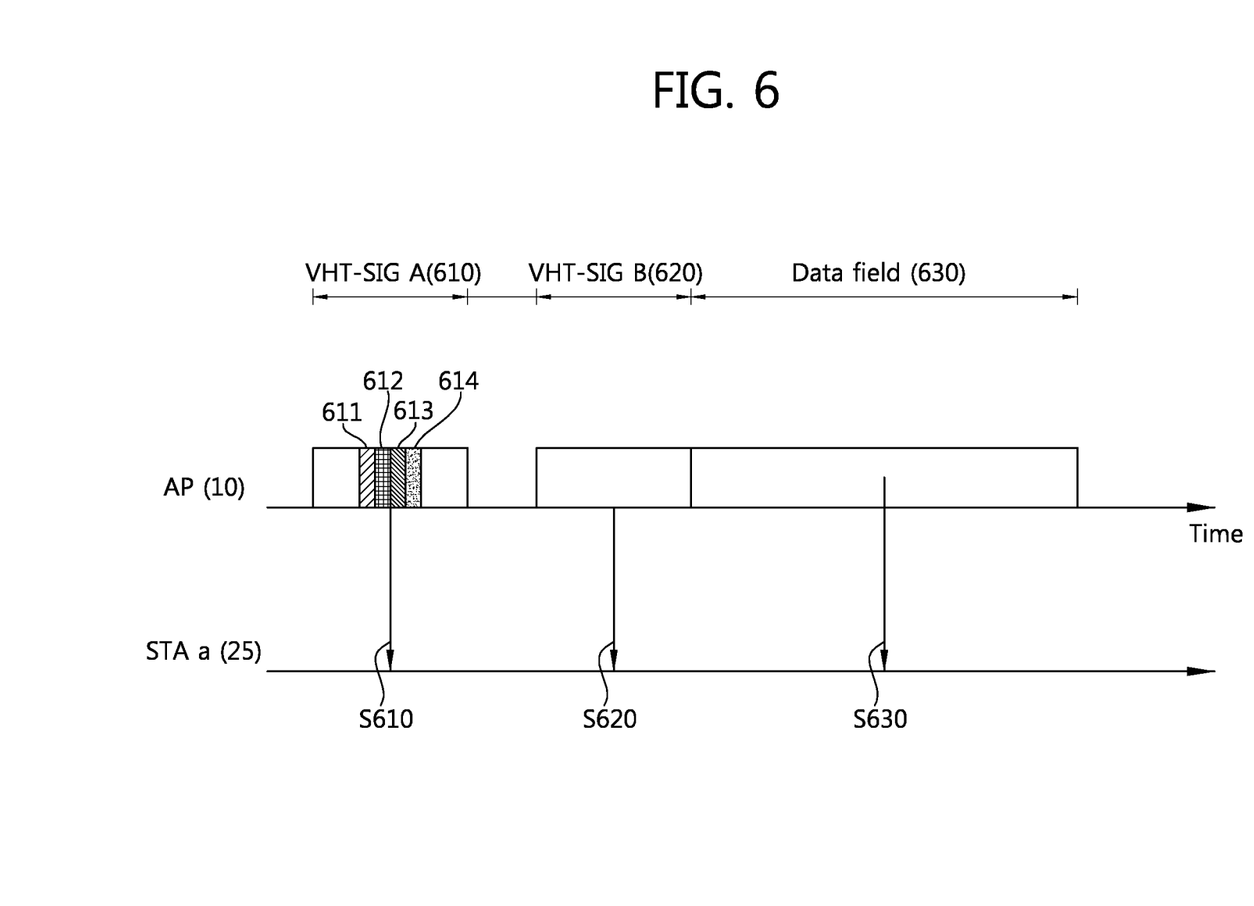
FIG. 6 is a flow diagram showing a PPDU transmission method on the basis of a single user (SU)-MIMO transmission scheme according to an embodiment of the present invention.

FIG. 6 is a flow diagram showing a PPDU transmission method on the basis of an SU-MIMO transmission scheme according to an embodiment of the present invention. An AP transmits a PPDU to a specific STA.

Referring to FIG. 6, an AP 10 transmits a VHT-SIGA field 610 to an STAa 30 (step S610). The VHT-SIGA field 610 includes a group ID sub-field 611, a spatial stream sub-field 612, a coding sub-field 613, and an MCS sub-field 614 similarly to those shown in FIG. 5. However, when a PPDU is transmitted using SU-MIMO, bit sequence values or a bit value which is set in the aforementioned sub-field can be interpreted differently from the embodiment of FIG. 4.

The group ID sub-field 611 can be set to a value indicating that a PPDU is transmitted using an SU-MIMO transmission scheme. For example, the group ID sub-field 611 can be configured to indicate either 0 to 63. By interpreting a value of the group ID sub-field 611 included in the VHT-SIGA field, the STAa 30 can know that the PPDU is transmitted using SU-MIMO.

The spatial stream sub-field 612 indicates the number of spatial streams allocated to transmit the PPDU to the STAa 30. In case of MU-MIMO transmission of FIG. 5, this field can be interpreted to indicate the number of spatial streams allocated to each of a plurality of STAs. On the other hand, in case of SU-MIMO transmission, this field is configured to indicate the number of spatial streams allocated to a transmission target STA, and the remaining bits can be configured to indicate a partial AID of the transmission target STA. The partial AID can be set to a part of a bit-stream of an AID which is identification information assigned when the STAa 30 is associated with the AP 10, and can be set to 9 least significant bits (LSBs) or 9 most significant bits (MSBs). Optionally, a new bit sequence can be set to a partial AID by using the AID.

When the spatial stream sub-field 612 is set to a value indicating SU-MIMO transmission, the coding sub-field 613 is set to a value indicating an encoding scheme of a PSDU. In case of SU-MIMO transmission, the number of the transmission target STAs is one, and thus one encoding scheme is applied when generating a PPDU. Therefore, the AP 10 configures the coding sub-field 613 to indicate BCC encoding or LDPC encoding.

When the PPDU is transmitted using SU-MIMO, one piece of MCS index information is enough for a channel between the AP 10 and the STAa 30. Therefore, the MCS index information is transmitted by being included in the MCS sub-field 614 of the VHT-SIGA field 610 instead of a VHT-SIGB field 620.

The AP 10 transmits the VHT-SIGB field 620 to the STAa 30 (step S620), and transmits a data field (step S630). The VHT-SIGB field may include information indicating a length of a PSDU included in the data field to be transmitted to the STAa 30.

By using a value which is set to the group ID sub-field 611 of the VHT-SIGA field 610 transmitted from the AP 10, the STAa 30 can know that the PPDU is transmitted using not MU-MIMO but SU-MIMO. In this case, the STAa 30 can know that the spatial stream sub-field 612 includes information indicating the number of spatial streams allocated to the STAa 30 and information indicating a partial AID instead of information indicating the number of spatial streams allocated to each of the plurality of STAs, and thus can interpret a bit sequence.

The STAa 30 can know an encoding scheme applied to the data field from the MCS sub-field 614 and MCS index information from the coding field 613, and by using this information, can obtain data by performing decoding and demodulation on the data field.

As shown in FIG. 5 and FIG. 6, a reception STA (or a plurality of reception STAs) of a PPDU can confirm whether a transmission scheme is MU-MIMO or SU-MIMO by using the group ID of the VHT-SIGA field 510 or 610, and thereafter can obtain data by differently interpreting values which are set in subsequent sub-fields.

Table 2 below shows an example of a VHT-SIGA field format indicating information included in a VHT-SIGA field applied to an embodiment of the present invention. The VHT-SIGA field can be divided into a VHT-SIGA1 field and a VHT-SIGA2 field. The VHT-SIGA1 field and the VHT-SIGA2 can be transmitted through respective OFDM symbols. Table 2 below may correspond to an example of a VHT-SIGA field included in the PPDU format of FIG. 3 applicable to the embodiment of the present invention.

TABLE 2

| Bit | Field | Bit assignment | Descriptions |
|---|---|---|---|
| | | | VHT-SIG-A1 |
| B0-B1 | Bandwidth | 2 | 0: 20 MHz, 1: 40 MHz, 2: 80 MHz, 3: 160 MHz and 80 + 80 MHz |
| B2 | Reserved | 1 | Reserved for bandwidth expansion |
| B3 | STBC | 1 | Set to 1 if STBC coding is applied to all streams, and otherwise set to 0 |
| B4-B9 | Group ID | 6 | SU-MIMO: '0' or '63'<br>MU-MIMO: Set to a value assigned to an STA group |
| B10-B21 | Spatial stream | 12 | MU-MIMO: Support 3 bits per STA, maximum 4 STAs<br>(STA u uses bits B(10 + 3 * u) − B(12 + 3 * u), where u = 0, 1, 2, 3)<br>0: 0 spatial stream<br>1: 1 spatial stream<br>2: 2 spatial streams<br>3: 3 spatial streams<br>4: 4 spatial streams<br>SU-MIMO<br>B10-B12<br>0: 1 spatial stream<br>1: 2 spatial streams<br>2: 3 spatial streams<br>3: 4 spatial streams<br>4: 5 spatial streams<br>5: 6 spatial streams<br>6: 7 spatial streams<br>7: 8 spatial streams<br>B13-B21<br>Partial AID: LSB bits of AID |
| B22-B23 | Reserved | 2 | All ones |
| | | | VHT-SIG-A2 |
| B0-B1 | Short GI | 2 | B0:<br>0: Short GI is not used in a data field<br>1: Short GI is used in a data field<br>B1:<br>1: If short GI is used, and the number of transmission symbols (Nsym) mod 1 = 9<br>0: otherwise |
| B2-B3 | Coding | 2 | SU-MIMO:<br>B2:<br>0: BCC encoding, 1: LDPC encoding<br>B3: Indicate an extended OFDM symbol for an LDPC encoded packet<br>MU-MIMO |

TABLE 2-continued

| Bit | Field | Bit assignment | Descriptions |
|---|---|---|---|
| | | | B2: Regarding $1^{st}$ STA, 0: BCC encoding, 1: LDPC encoding<br>B3: Indicate an extended OFDM symbol for an LDPC encoded packet |
| B4-B7 | MCS | 4 | SU-MIMO<br>B4-B7: MCS index<br>MU-MIMO(when the number of spatial streams for a corresponding STA is 0, each bit is set to 1)<br>B4: Regarding $2^{nd}$ ST, 0: BCC encoding, 1: LDPC encoding<br>B5: Regarding $3^{rd}$ STA, 0: BCC encoding, 1: LDPC encoding<br>B6: Regarding $4^{th}$ STA, 0: BCC encoding, 1: LDPC encoding<br>B7: Reserved and set to 1 |
| B8 | Beamforming | 1 | SU-MIMO:<br>1: if a beamforming steering matrix is applied to a waveform of SU transmission: otherwise<br>MU-MIMO: Reserved (set to 1) |
| B9 | Reserved | 1 | Reserved (set to 1) |
| B10-B17 | CRC | 8 | |
| B18-B23 | Tail | 6 | |

In addition to the PPDU transmission and reception method of FIG. 5 and FIG. 6 in which a coding sub-field indicating an applied encoding scheme is included in a VHT-SIGA field, a bit sub-field indicating an encoding scheme can be included in the VHT-SIGA field. A one-bit sized coding sub-field can be included in the VHT-SIGA field in such a manner that BCC encoding is indicated when the field is set to '0' and LDPC encoding is indicated when the field is set to '1'.

When all of MU-MIMO paired STAs support BCC encoding, the AP can transmit a PPDU by setting a coding sub-field value of the VHT-SIGA field to '0'. In this case, each PSDU of the transmitted data field is transmitted through BCC encoding. When all of the MU-MIMO paired STAs support BCC and LDPC encoding, the AP can transmit the PPDU by setting a coding sub-field value of the VHT-SIGA field to '1'. In this case, each PSDU of the transmitted data field is transmitted through LDPC encoding.

When some of the MU-MIMO paired STAs support BCC encoding and some of the MU-MIMO paired STAs support both BCC/LDPC encoding, the AP can transmit the PPDU by setting the coding sub-field of the VHT-SIGA field to '1'. However, the AP transmits the PSDU of the data field by performing encoding according to a corresponding encoding scheme in accordance with an encoding scheme that can be supported by a transmission target STA. In this case, the STAs supporting both BCC/LDPC encoding can decode the data field in accordance with LDPC encoding. However, the STAs supporting only BCC encoding can decode the data field in accordance with BCC encoding while ignoring a value of the coding sub-field.

According to the PPDU transmission method described above with reference to the drawings, the AP can transmit PPDUs each using a different encoding scheme with respect to STAs supporting different encoding schemes through a MU-MIMO transmission scheme, and MU-MIMO paired STAs can confirm an appropriate decoding scheme and then can obtain data by performing decoding.

Figure 7:
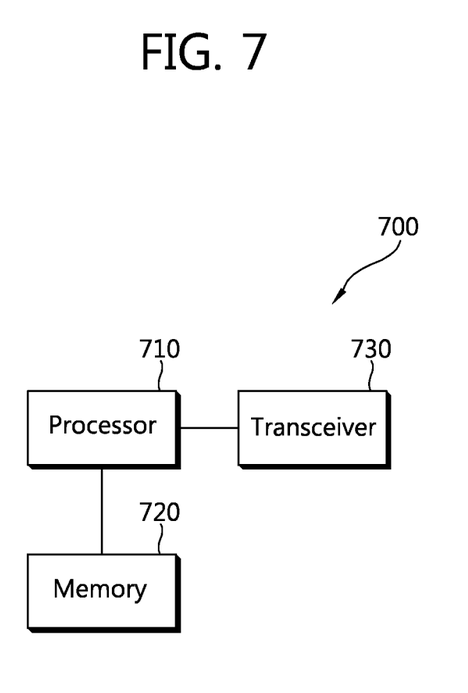
FIG. 7 is a block diagram showing a wireless apparatus to which an embodiment of the present invention is applicable.

FIG. 7 is a block diagram showing a wireless apparatus to which an embodiment of the present invention is applicable. The wireless apparatus may be an AP or an STA.

A wireless apparatus 700 includes a processor 710, a memory 720, and a transceiver 730. The transceiver 730 transmits and/or receives a radio signal, and implements an IEEE 802.11 PHY layer. The processor 710 is operationally coupled to the transceiver 730, and implements IEEE 802.11 MAC and PHY layers. The processor 710 can be configured to generate a PPDU format proposed in the present invention and to transmit the PPDU format. Further, the processor 710 can be configured to acquire control information by receiving the transmitted PPDU and interpreting a field value included in the PPDU and to acquire data by using the control information. The processor 710 can be configured to implement the aforementioned embodiment of the present invention described with reference to FIG. 2 to FIG. 6.

The processor 710 and/or the transceiver 730 may include an application-specific integrated circuit (ASIC), a separate chipset, a logic circuit, and/or a data processing unit. The memory 720 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 720 and may be performed by the processor 710. The memory 720 may be located inside or outside the processor 710, and may be coupled to the processor 710 by using various well-known means.

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of transmitting a packet in a wireless local area network system, the method performed by a transmitting station and comprising:
   generating the packet comprising a data field and a first signal field including a first field, a second field, and a third field; and
   transmitting the packet to a single receiving station or a plurality of receiving stations,
   wherein the first field indicates a group ID of the single receiving station or the plurality of receiving stations and whether the packet is generated based on a single user transmission scheme or a multi user transmission scheme,
   wherein, for the single user transmission scheme, at least one pre-determined value of the first field is used to indicate that the packet is generated based on the single user transmission scheme, and, for the multi user transmission scheme, at least one value of the first field is a value assigned to a station group for the multi user transmission scheme,
   wherein the second field and the third field are determined based on whether the packet is generated based on the single user transmission scheme or the multi user transmission scheme,
   the second field has a length of four bits including a first bit to a fourth bit,
   the four bits of the second field are used to indicate a modulation and coding scheme (MCS) index used for the packet if the packet is generated based on the single user transmission scheme,
   each of the first, second and third bits of the second field is used to indicate an encoding scheme applied to a corresponding receiving station of the plurality of receiving stations if the packet is generated based on the multi user transmission scheme,
   the third field indicates an encoding scheme applied to the single receiving station if the packet is generated based on the single user transmission scheme, and
   the third field indicates an encoding scheme applied to a receiving station of the plurality of receiving stations which is not indicated by the second field if the packet is generated based on the multi user transmission scheme.

2. The method of claim 1, wherein the encoding scheme comprises one of:
   a binary convolution coding (BCC) encoding scheme, and
   a low density parity check (LDPC) encoding scheme.

3. The method of claim 1, wherein the packet further comprises a second signal field including a second MCS field, the second MCS field indicating an MCS used for the data field if the packet is generated based on the multi user transmission scheme.

4. The method of claim 3, wherein the packet further comprises a training sequence used to estimate a wireless channel, and
   wherein the training sequence is positioned in the packet between the first and second signal fields.

5. The method of claim 1, wherein the first signal field further includes a fourth field indicating a number of spatial streams used for transmitting the data field.

6. A transmitting station for transmitting a packet in a wireless local area network system, the transmitting station comprising:
   a transmitter; and
   a controller operatively connected to the transmitter and configured to:
      generate the packet comprising a data field and a first signal field including a first field, a second field, and a third field, and
      transmit the packet to a single receiving station or a plurality of receiving stations,
   wherein the first field indicates a group ID of the single receiving station or the plurality of receiving stations and whether the packet is generated based on a single user transmission scheme or a multi user transmission scheme,
   wherein, for the single user transmission scheme, at least one pre-determined value of the first field is used to indicate that the packet is generated based on the single user transmission scheme, and, for the multi user transmission scheme, at least one value of the first field is a value assigned to a station group for the multi user transmission scheme,
   wherein the second field and the third field are determined based on whether the packet is generated based on the single user transmission scheme or the multi user transmission scheme,
   the second field has a length of four bits including a first bit to a four bit,
   the four bits of the second field are used to indicate a modulation and coding scheme (MCS) index used for the packet if the packet is generated based on the single user transmission scheme,
   each of the first, second, and third bits of the second field is used to indicate an encoding scheme applied to a corresponding receiving station of the plurality of receiving stations if the packet is generated based on the multi user transmission scheme,
   the third field indicates an encoding scheme applied to the single receiving station if the packet is generated based on the single user transmission scheme, and
   the third field indicates an encoding scheme applied to a receiving station of the plurality of receiving stations which is not indicated by the second field if the packet is generated based on the multi user transmission scheme.

7. The transmitting station of claim 6, wherein the encoding scheme comprises one of:
   a binary convolution coding (BCC) encoding scheme, and
   a low density parity check (LDPC) encoding scheme.

8. The transmitting station of claim 6, wherein the packet further comprises a second signal field including a second MCS field, the second MCS field indicating an MCS used for the data field if the packet is generated based on the multi user transmission scheme.

9. The transmitting station of claim 8, wherein the packet further comprises a training sequence used to estimate a wireless channel, and
   wherein the training sequence is positioned in the packet between the first and second signal fields.

10. The transmitting station of claim 6, wherein the first signal field further includes a fourth field indicating a number of spatial streams used for transmitting the data field.

11. A method of receiving a packet from a transmitting station in a wireless local area network system, the method performed by a receiving station and comprising:
    receiving the packet comprising a data field and a first signal field including a first field, a second field, and a third field; and processing the received packet,
wherein the first field indicates a group ID and whether the packet is generated based on a single user transmission scheme or a multi user transmission scheme,
wherein, for the single user transmission scheme, at least one pre-determined value of the first field is used to indicate that the packet is generated based on the single user transmission scheme, and, for the multi user transmission scheme, at least one value of the first field is a value assigned to a station group for the multi user transmission scheme,
wherein the second field and the third field are determined based on whether the packet is generated based on the single user transmission scheme or the multi user transmission scheme,
the second field has a length of four bits including a first bit to a fourth bit,
the four bits of the second field are used to indicate a modulation and coding scheme (MCS) index used for the packet if the packet is generated based on the single user transmission scheme,
each of the first, second and third bits of the second field is used to indicate an encoding scheme applied to a corresponding receiving station of a plurality of receiving stations if the packet is generated based on the multi user transmission scheme,
the third field indicates an encoding scheme applied to a single receiving station if the packet is generated based on the single user transmission scheme, and
the third field indicates an encoding scheme applied to a receiving station of the plurality of receiving stations which is not indicated by the second field if the packet is generated based on the multi user transmission scheme.

12. The method of claim 11, wherein the encoding scheme comprises one of:
a binary convolution coding (BCC) encoding scheme, and
a low density parity check (LDPC) encoding scheme.

13. The method of claim 11, wherein the packet further comprises a second signal field including a second MCS field, the second MCS field indicating an MCS used for the data field if the packet is generated based on the multi user transmission scheme.

14. The method of claim 13, wherein the packet further comprises a training sequence used to estimate a wireless channel, and
wherein the training sequence is positioned in the packet between the first and second signal fields.

15. The method of claim 11, wherein the first signal field further includes a fourth field indicating a number of spatial streams used for transmitting the data field.

16. A receiving station for receiving a packet from a transmitting station in a wireless local area network system, the receiving station comprising:
a transmitter; and
a controller operatively connected to the transmitter and configured to:
receive the packet comprising a data field and first signal field including a first field, a second field, and a third field and
process the received packet,
wherein the first field indicates a group ID and whether the packet is generated based on a single user transmission scheme or a multi user transmission scheme,
wherein, for the single user transmission scheme, at least one pre-determined value of the first field is used to indicate that the packet is generated based on the single user transmission scheme, and, for the multi user transmission scheme, at least one value of the first field is a value assigned to a station group for the multi user transmission scheme,
wherein the second field and the third field are determined based on whether the packet is generated based on the single user transmission scheme or the multi user transmission scheme,
the second field has a length of four bits including a first bit to a four bit,
the four bits of the second field are used to indicate a modulation and coding scheme (MCS) index used for the packet if the packet is generated based on the single user transmission scheme,
each of the first, second, and third bits of the second field is used to indicate an encoding scheme applied to a corresponding receiving station of a plurality of receiving stations if the packet is generated based on the multi user transmission scheme,
the third field indicates an encoding scheme applied to a single receiving station if the packet is generated based on the single user transmission scheme, and
the third field indicates an encoding scheme applied to a receiving station of the plurality of receiving stations which is not indicated by the second field if the packet is generated based on the multi user transmission scheme.

17. The receiving station of claim 16, wherein the encoding scheme comprises one of:
a binary convolution coding (BCC) encoding scheme, and
a low density parity check (LDPC) encoding scheme.

18. The receiving station of claim 16, wherein the packet further comprises a second signal field including a second MCS field, the second MCS field indicating an MCS used for the data field if the packet is generated based on the multi user transmission scheme.

19. The receiving station of claim 18, wherein the packet further comprises a training sequence used to estimate a wireless channel, and
wherein the training sequence is positioned in the packet between the first and second signal fields.

20. The receiving station of claim 16, wherein the first signal field further includes a fourth field indicating a number of spatial streams used for transmitting the data field.

* * * * *